United States Patent
Mueller

(10) Patent No.: US 8,363,681 B2
(45) Date of Patent: Jan. 29, 2013

(54) METHOD AND APPARATUS FOR USING RANGING MEASUREMENTS IN A MULTIMEDIA HOME NETWORK

(75) Inventor: Arndt Mueller, San Diego, CA (US)

(73) Assignee: Entropic Communications, Inc., San Diego, CA (US)

( * ) Notice: Subject to any disclaimer, the term of this patent is extended or adjusted under 35 U.S.C. 154(b) by 462 days.

(21) Appl. No.: 12/580,127

(22) Filed: Oct. 15, 2009

(65) Prior Publication Data

US 2010/0098110 A1 Apr. 22, 2010

Related U.S. Application Data

(60) Provisional application No. 61/105,942, filed on Oct. 16, 2008, provisional application No. 61/144,061, filed on Jan. 12, 2009, provisional application No. 61/144,676, filed on Jan. 14, 2009.

(51) Int. Cl.
  *H04J 3/06* (2006.01)
  *H04L 12/28* (2006.01)
  *H04L 12/56* (2006.01)

(52) U.S. Cl. ............. 370/509; 370/395.62; 370/503; 370/510; 370/511; 370/513; 370/514; 370/519

(58) Field of Classification Search ............. 370/395.62, 370/518, 350, 503, 509–514, 519
See application file for complete search history.

(56) References Cited

U.S. PATENT DOCUMENTS

| | | | |
|---|---|---|---|
| 5,349,582 A | 9/1994 | Bisdikian et al. | |
| 6,956,865 B1 | 10/2005 | Khaunte et al. | |
| 7,054,296 B1 | 5/2006 | Sorrells et al. | |
| 2005/0287964 A1 | 12/2005 | Tanaka et al. | |
| 2007/0133386 A1 | 6/2007 | Kim et al. | |
| 2008/0013473 A1 | 1/2008 | Proctor, Jr. et al. | |
| 2008/0056308 A1* | 3/2008 | Zumsteg | 370/503 |
| 2008/0076432 A1 | 3/2008 | Senarath et al. | |
| 2008/0271076 A1* | 10/2008 | Schlack | 725/39 |

FOREIGN PATENT DOCUMENTS

WO 2008/039951 A1 4/2008

OTHER PUBLICATIONS

Examination Report for App No. GB1104519.2, completed May 23, 2012.

* cited by examiner

*Primary Examiner* — Michael Thier
*Assistant Examiner* — Benjamin H Elliott, IV
(74) *Attorney, Agent, or Firm* — Bruce Greenhaus

(57) ABSTRACT

According to various embodiments of the disclosure, systems, methods and apparatuses are provided for using ranging to improve network efficiency. In particular, various embodiments of the disclosure provide ranging to improve local clock time synchronization. According to one embodiment, a method for synchronizing a plurality of nodes on a communication network is provided, comprising: exchanging local clock times between a first node and a second node over the communication network; performing a ranging method between the first and second nodes based on the local clock times exchanged between the first and second nodes, wherein the ranging method results in an estimated propagation delay between the first and second nodes; and adjusting the local clock times of the first and second nodes based on the estimated propagation delay, thereby resulting in a synchronized local clock time at the first and second nodes.

40 Claims, 14 Drawing Sheets

METHOD AND APPARATUS FOR USING RANGING MEASUREMENTS IN A MULTIMEDIA HOME NETWORK

RELATED APPLICATIONS

This application claims the benefit of U.S. Provisional Patent Applications Ser. No. 61/105,942 filed Oct. 16, 2008, and Ser. No. 61/144,061 filed Jan. 12, 2009, and Ser. No. 61/144,676 filed Jan. 14, 2009, each of which is hereby incorporated herein by reference in the respective entirety of each.

FIELD OF THE DISCLOSURE

The present disclosure relates to networks, and more particularly, some embodiments relate to using range estimates to improve efficiency in networks, particularly networking over coaxial cable.

DESCRIPTION OF THE RELATED ART

With the many continued advancements in communications and data transfer technology, more and more devices are being introduced in both the consumer and commercial sectors with advanced, high bandwidth communications capabilities. Additionally, advances in processing power and low-power consumption technologies have led to the proliferation of communications capabilities in various products on a widespread basis.

For example, communication networks are now commonplace in many home and office environments. Such networks allow various previously independent devices to share data and other information to enhance productivity or simply to improve their convenience to the user. Against this backdrop, home networking has become central to the evolving home "infotainment" market. Indeed, there is a growing demand for the ability to connect content devices (e.g., televisions, DVD players and recorders, digital cameras, speakers, video cameras, etc.), computing devices, I/O devices, home appliances and modems.

Home entertainment networks are typically provided in one of two topologies. The first is an Access topology, which can be best analogized to a tree structure wherein a base node communicates with nodes in its branches, but branch nodes do not typically communicate directly with other branches. The second is a Mesh topology in which any node can communicate directly with any other node in the network. Access topologies are typically found in apartment or office settings where a master node at the 'source' is used to distribute data to a plurality of downstream nodes (e.g., to the various apartments in an apartment building) and the downstream nodes (e.g., apartments) do not need to share content with one another. Mesh topologies, on the other hand, might be more typically found in a home environment where, although there may be a common source of broadband data (e.g., the main cable feed into the home), the homeowners may wish to share content originating from a device in one room with other devices in other rooms in their home.

To address the growing demand for a digital home networking market, a consortium of industry leading companies formed the Multimedia over Coax Alliance (MoCA™). MoCA has provided a technical standard (referred to as "MoCA 1.0") which defines a protocol for distributing digital entertainment over the available bandwidth on coaxial cable previously installed in households for cable or satellite TV service. The initial MoCA standard was approved in February 2006, and routers with built-in MoCA capabilities (i.e., that conform to the MoCA 1.0 standard), MoCA set-top boxes and MoCA adapters followed shortly thereafter. Accordingly, one Mesh topology is defined by the MoCA 1.0 standard.

Architects of these and other networks, and indeed communications channels in general, have long struggled with the challenge of managing multiple communications from various devices across a limited channel. Accordingly, network architects have come up with various solutions to arbitrate disputes or otherwise allocate bandwidth among the various communicating devices, or clients, on the network. Schemes used in well known network configurations such as token rings, Ethernet, and other configurations have been developed to allow sharing of the available bandwidth.

FIG. 1 is a diagram illustrating one example of a home cable network. The example of a home environment illustrated in FIG. 1 also includes examples of equipment and other electronic devices or nodes that might be found in a typical home-networking environment such as the network defined by MoCA 1.0. The network of FIG. 1 includes set-top boxes 111 and televisions (TVs) 110 found in the master bedroom 115, the bedroom 114, and the family room 113. Also, a typical home network might include computing systems such as a desktop computing system 117 and peripherals as illustrated in the den 113, and a laptop computer 118 such as that illustrated in the kitchen 112. Other content devices or network devices might also be provided.

A MoCA network includes a plurality of client nodes, such as TVs 110, set top boxes 111 and computers 117, 118. It should be noted that TVs, 110, set top boxes 111 and computers 117, 118 are configured with a communication device that allows these devices to operate as a client node on the MoCA network. The protocol established by MoCA includes a layered approach, in which the first layer is the physical (PHY) layer and the second layer is the Media Access Control (MAC) layer. Initially, upon setting up a MoCA network, one of the client nodes is automatically selected to be a network coordinator (NC). The network coordinator (NC) is relied upon to schedule all traffic on the network, thereby allocating the network bandwidth and avoiding packet collisions. The NC communicates the schedule to each client node in "Media Access Packets" (MAPs), where each MAP is a packet of information. One MAP is sent by the NC during each "MAP cycle".

In order to facilitate the scheduling, the NC and each node in the network maintains a local channel time clock (CTC) counter and all nodes are responsible for synchronizing their CTC counts to that of the NC. The period of each CTC tick is referred to as a "SLOT_TIME." The CTC is encoded in either MAC header or payload of MoCA network packets, depending on the type of data or link control packet. Additionally, the CTC resolution under the MoCA 1.x specification is 20 nsec. The encoded CTC count of the MoCA network packet represents the time instant that the first sample of the PHY preamble is transmitted on to the network medium. When receiving MAP packets (or any other packet from the NC), each node records the instant in time when it received the first sample of the PHY preamble of the MAP packet using its local CTC count. The receiver then adjusts its own CTC count to synchronize it to the NC's counter.

FIG. 2 is a diagram illustrating such a CTC synchronization process between a node (Node 1) and a NC (Node 0) under the MoCA 1.x standard. Based on the MoCA 1.x specification, the CTC of any node may not lead the NC's CTC more than 0.2 μsec (in the case of −200 PPM offset) or lag the NC's CTC any more than 2.2 μsec (110 SLOT_TIMES). The diagram of FIG. 2 accounts for the 2.1 μsec, with the remaining 0.1 μsec being accounted for by sampling drift due to frequency offsets. Based on MoCA, inaccuracies to the CTC are can be introduced by several factors, including but not limited to: delay in transmission (0.4 μsec), propagation delay (i.e., time it takes for the NC's packet to propagate through the medium to the receiver ~0.9 μsec), receive delay (variances in the manner packet arrival time is estimated ~0.8 μsec), clock drifts between nodes (~0.2 μsec, given a drift up to ±200/1e6×50e6 SLOT_TIMES/sec×1e-3 sec/MAP=±10 SLOT_TIMES per 1 msec MAP cycle), implementation delays (delay through the PHY and analog circuitry in the transmit direction and the receive direction; often negligible), noise (often negligible), and vendor implementation differences in estimating packet transmission time (often negligible).

FIG. 3 is a diagram illustrating the ambiguity in packet arrival time between two nodes (Node 1 and Node 2) under the MoCA 1.x standard. Specifically, the diagram illustrates a consequence of the 0 to 2.2 μsec CTC time ambiguity described above. In order to compensate for the CTC time ambiguity, the packet transmission time variability requires an extra 2.6 μsec in inter-frame gap (IFG), which is the amount of time between network packets. In addition, the packet arrival time will have −2.2 to +3.5 μsec of unpredictability.

FIG. 4 is a diagram illustrating the "true" inter-frame gap for a particular node under the MoCA 1.x standard. The true" inter-frame gap indicates the amount of time the node has after processing a first packet to prepare for the next packet. The local $CTC_{Start}$ and $CTC_{End}$ times noted in the diagram indicate the expected start and end times for the node (as computed from the MAP) using the local CTC of the node. The hash marks in each line of the diagram indicate the variability in the times at which packets arrive and are transmitted with respect to the local $CTC_{Start}$ and $CTC_{End}$. Transmissions occur with a 0 to +0.4 μsec ambiguity. There is also an assumed −1.3 to +3.5 μsec packet arrival ambiguity. Accordingly, the transmission of a first packet 401 is completed at sometime between $CTC_{start}$ and 0.4 μsec after $CTC_{start}$. Likewise, transmission of the next packet 403 begins sometime between $CTC_{End}$ and 0.4 μsec after $CTC_{End}$. Packet 405 is received sometime between $CTC_{End}$ minus 1.3 μsec and $CTC_{End}$ plus 3.5 μsec. Likewise, assuming that there is no error in the local CTC clock, packet 407 is received sometime between $CTC_{Start}$ and 3.5 μsec later. Therefore, the "true" inter-frame gap can be defined as the 'guaranteed' quiet portion of the IFG, which is 3.5 μsec after $CTC_{Start}$ and 1.3 μsec before the $CTC_{End}$ or equivalently IFG −4.8 μsec. Accordingly, there is a relatively large IFG that is required to account of the ambiguities.

BRIEF SUMMARY OF EMBODIMENTS OF THE DISCLOSURE

According to various embodiments of the disclosure, systems, methods and apparatuses are provided for using ranging to improve network efficiency. In particular, various embodiments of the disclosure provide ranging to improve local clock time synchronization. Ranging is a method by which nodes measure and/or estimate the propagation delays to and from other nodes in the network. Depending on the embodiment, ranging can result in reduced inter-frame gap (IFG) by more accurately controlling the expected start and end times for arriving network packets. Ranging thus provides more predictable network packet arrival times that can be used to decrease the IFG without decreasing the "true" IFG.

Furthermore, for orthogonal frequency division multiple access (OFDMA) schemes, such as those used in MoCA standards, multiple packets are transmitted simultaneously. As such, it is desirable for all OFDMA packets to arrive at the OFDMA receiver at roughly the same time, otherwise network performance suffers with the need for longer cyclic prefix lengths to synchronize multiple OFDMA packets. With some embodiments, the ranging results in clock synchronization that allows for substantially simultaneous arrival of OFDMA packets at the receiver, thereby reducing the cyclic prefix length needed. Ranging can also result in improvements to a receiver's automatic gain control (AGC) and burst detection performance.

Additionally, further embodiments can provide finer local clock resolution than has been traditionally provided. For example, as previously stated, in MoCA 1.x the CTC resolution is 20 nsec. With the use of some embodiments, a CTC resolution of 5 nsec can be attached given a 200 MHz high-RF sampling rate (i.e., the CTC counter is incremented by 0.25 SLOT_TIMES at the 200 MHz sampling rate).

According to one embodiment, a method for synchronizing a plurality of nodes on a communication network is provided, comprising: exchanging local clock times between a first node and a second node over the communication network; performing a ranging method between the first and second nodes based on the local clock times exchanged between the first and second nodes, wherein the ranging method results in an estimated propagation delay between the first and second nodes; and adjusting the local clock times of the one or both of the nodes based on the estimated propagation delay, thereby resulting in a synchronized local clock time at the first and second nodes. In some such embodiments, the method further comprises using the synchronized local clock time in subsequent packet transmissions between the first and second nodes.

In some embodiments, the steps of exchanging local clock times, performing the ranging method, and adjusting the local clock times comprises: transmitting from the first node and receiving at the second node a first packet, wherein the first packet comprises a first packet clock time comprising the local clock time of the first node at transmission time, and a scheduled arrival clock time; setting the local clock time of the second node to the first packet clock time; transmitting from the second node and receiving at the first node a second packet at the first scheduled arrival clock time, wherein the second packet is received by the first node at an actual arrival clock time; calculating and storing the estimated propagation delay at the first node, wherein calculating the estimated propagation delay is based on the first scheduled arrival clock time and the first actual time; transmitting from the first node and receiving at the second node a third packet, wherein the third packet comprises the estimated propagation delay; and storing the estimated propagation delay at the second node. In an alternative embodiment, the delay is used to adjust the clock without storing.

For various embodiments, a transmission time of a transmitted packet is measured at 90% of peak amplitude of a transmission signal, 90% of peak power of a transmission signal, 90% of total power of a transmission signal, the first arrival instant of the packet, the last arrival instant of a packet (different than the first arrival instant in the case of mediums comprising multiple different length paths between the transmitter and receiver) or a mean delay of a transmission signal. For yet other embodiments, an arrival time of a received packet is measured at 90% of peak amplitude of a received signal, 90% of peak power of a received signal, 90% of total power of a received signal, or a mean delay of the received signal.

In various embodiments, the first node may be a network coordinator, and the second node is a new node and the method is performed as part of admission of the second node to the communication network. Additionally, in some embodiments, the method is performed periodically to maintain synchronization between the first and second nodes.

For some embodiments, the communication network is a mesh network. For yet further embodiments, the communication network operates in accordance with a Multimedia over Coax Alliance (MoCA) standard.

Additional embodiments of the disclosure provide computer program products, network devices, and network interface modules incorporating functions or features similar to those described above with respect to method embodiments of the disclosure.

Other features and aspects of the disclosure will become apparent from the following detailed description, taken in conjunction with the accompanying drawings, which illustrate, by way of example, the features in accordance with embodiments of the disclosure. The summary is not intended to limit the scope of the invention, which is defined solely by the claims attached hereto.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments of the disclosure. These drawings are provided to facilitate the reader's understanding of the disclosure and shall not be considered limiting of the breadth, scope, or applicability of the disclosure. It should be noted that for clarity and ease of illustration these drawings are not necessarily made to scale.

The figures are not intended to be exhaustive or to limit the disclosure to the precise form disclosed. It should be understood that the disclosure can be practiced with modification and alteration, and that the invention should be limited only by the claims and the equivalents thereof.

DETAILED DESCRIPTION OF THE
EMBODIMENTS OF THE DISCLOSURE

The present disclosure is directed toward systems, methods and apparatuses for using ranging to improve network efficiency. In some embodiments, ranging is utilized to improve local clock time synchronization. In doing so, various embodiments of the disclosure are capable of reducing the inter-frame gap (IFG), increased predictability of packet arrival times, reducing the cyclic prefix length for some frequency division multiple access schemes, such as OFDMA. For additional embodiments, the disclosure allows for receiver analog components to have more settling time (IFG minus 2 μsec); an automatic gain control (AGC) to ensure that it does not track on pre-packet noise or interference; a burst detector to have a reduced search window time (e.g., to ±10 samples) thereby eliminating false or missed detection; and a high-throughput unicast preamble that uses just a portion of the channel estimation symbols for burst detection. For OFDMA, ranging can limit or eliminate burst detection (which is advantageous given that OFDMA preambles are a blend from multiple transmitters).

Figure 1:
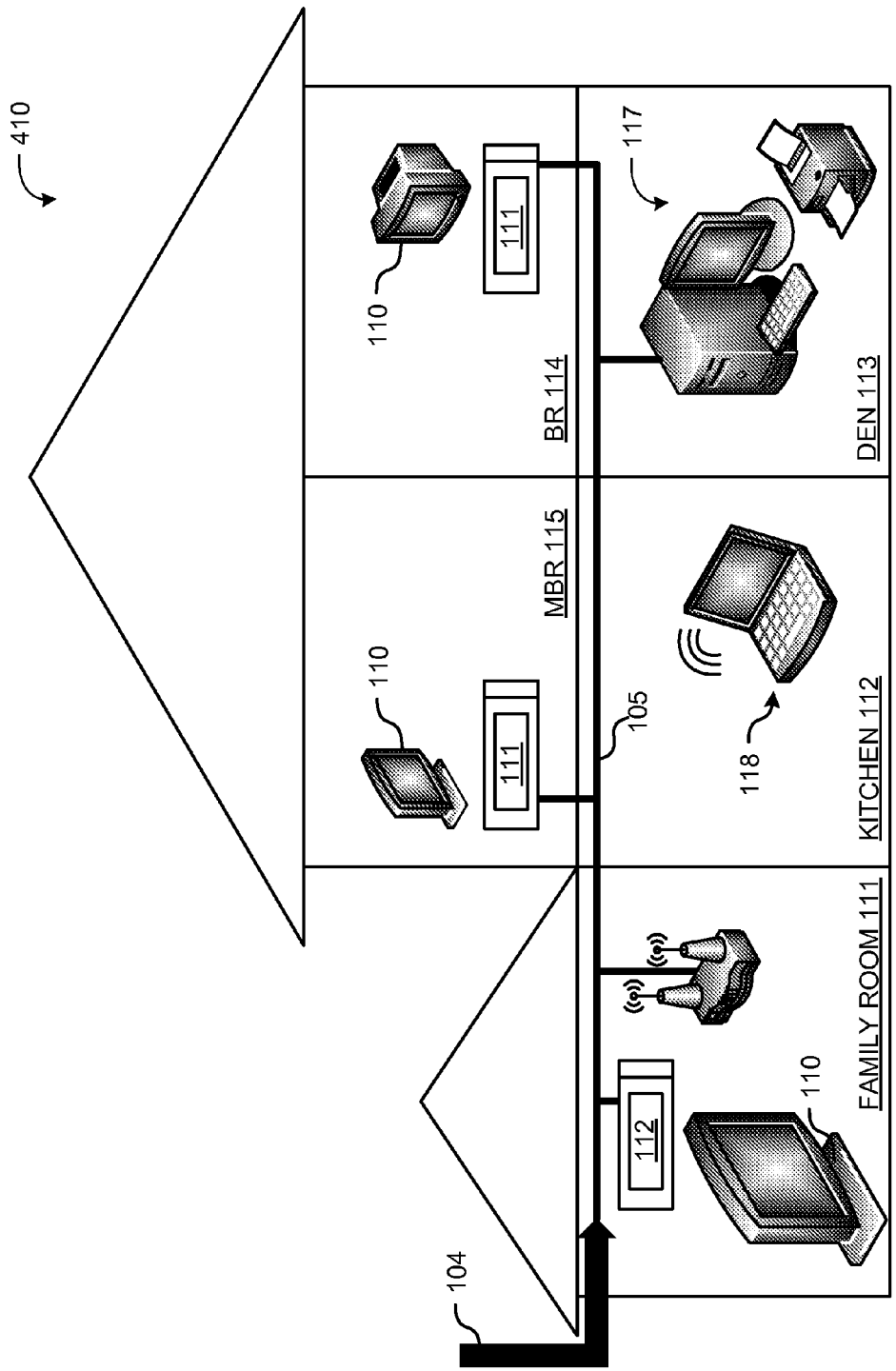
FIG. 1 is a diagram illustrating an example implementation of a home cable network in accordance with one example of an environment for the disclosure.
Figure 2:
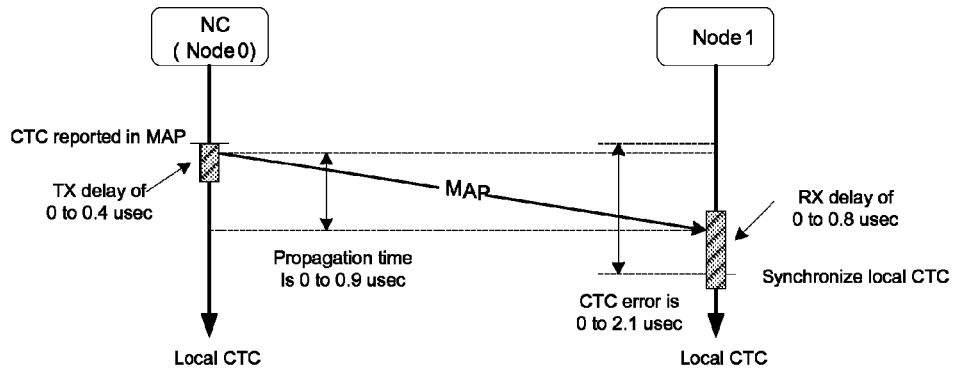
FIG. 2 is a diagram illustrating a CTC synchronization process between a node and a NC under the MoCA 1.x standard.
Figure 3:
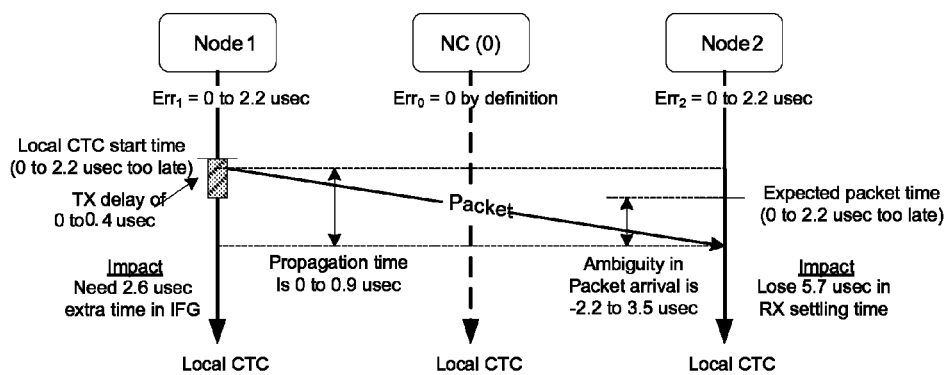
FIG. 3 is a diagram illustrating the ambiguity in packet arrival time between two nodes (Node 1 and Node 2) under the MoCA 1.x standard.
Figure 4:
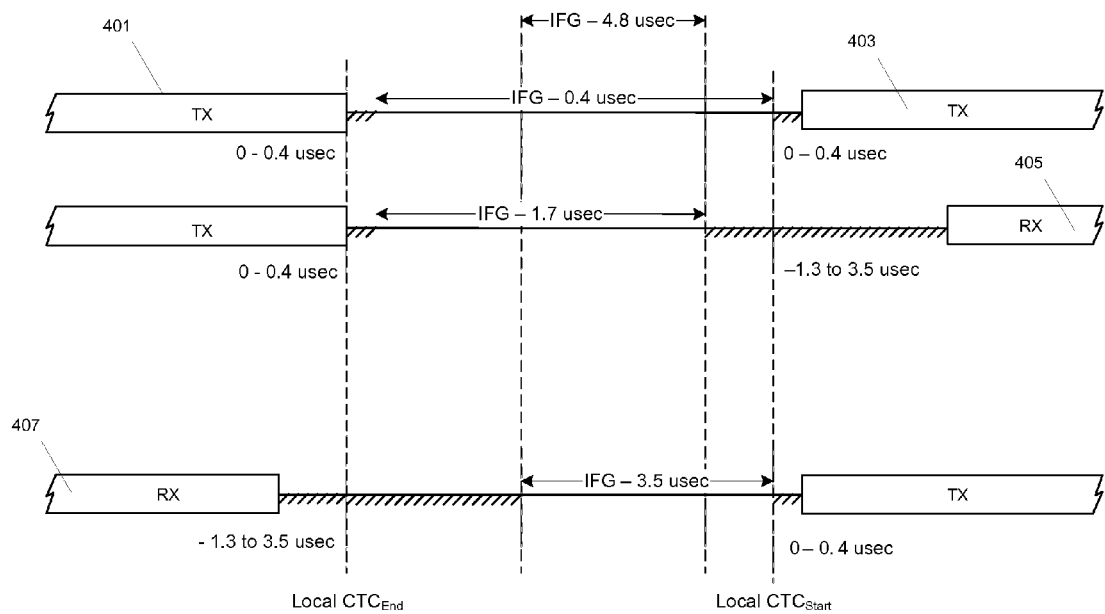
FIG. 4 is a diagram illustrating the "true" inter-frame gap for a particular node under the MoCA 1.x standard.

One example environment in which embodiments of the disclosure can be implemented is a home cable network, such as the example network previously described with respect to FIG. 1.

Figure 5:
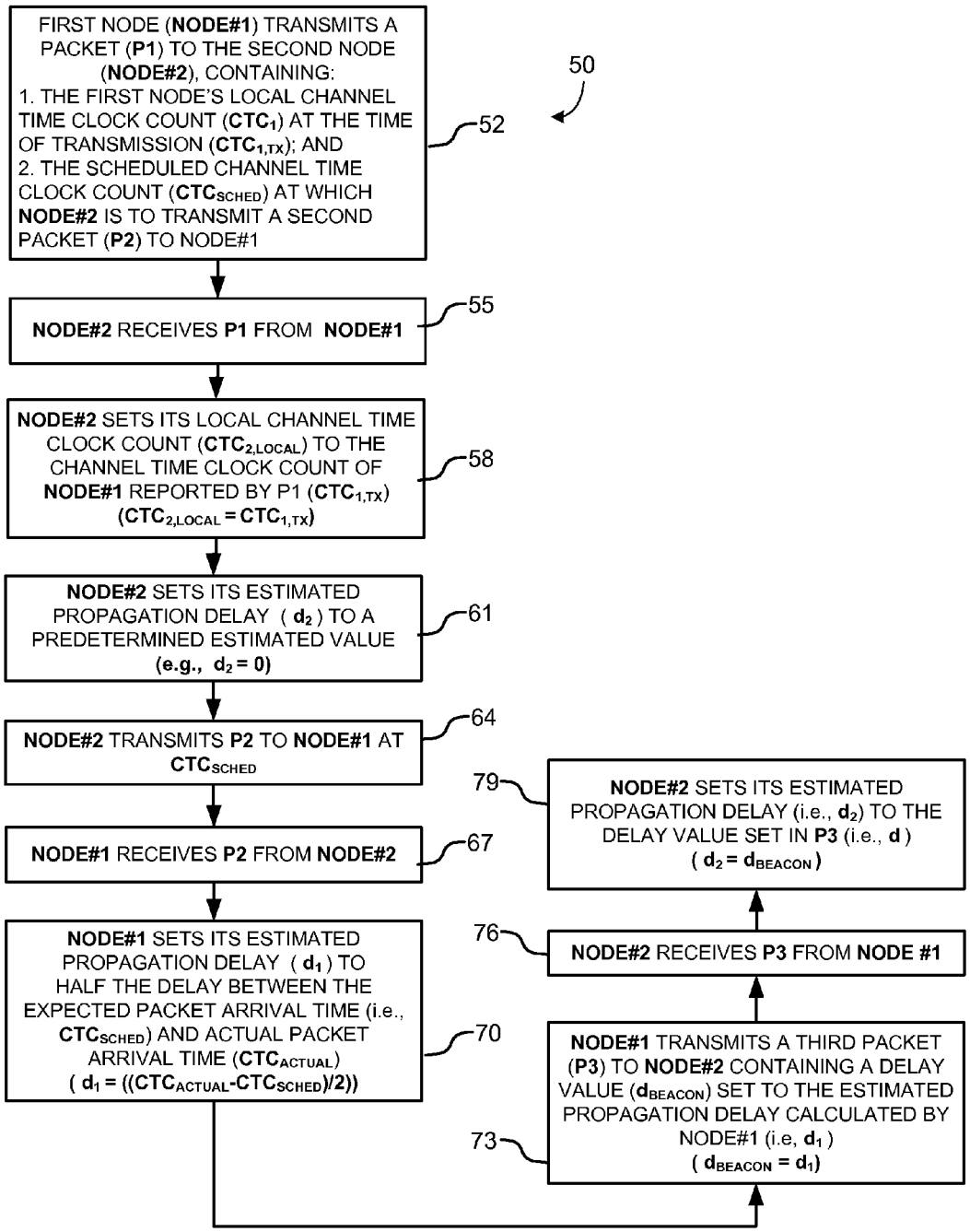
FIG. 5 is a flowchart of a method for synchronizing a plurality of nodes in accordance with one embodiment of the disclosure.

FIG. 5 is a flowchart of a method 50 for synchronizing a plurality of nodes in accordance with one embodiment of the disclosure. The method begins at operation 52, with a first node (Node#1) transmitting a first network packet P1 to a second node (Node#2) over a communication network. The network packets can be one of several different packet types including, but not limited to, data packets, control packets, and probe packets. The type of packet will vary depending on the type of communication network involved. For example, on a MoCA network, packet P1 could be an error vector magnitude packet (EVM), Beacon packet, Admission Request Packet, Admission Response Packet, or a MAP packet. Additionally, the packet may be transmitted in a variety of different modes, including, but in no way limited to, one-to-many 'broadcast' packets, many-to-one packets (e.g., OFDMA packets), one-to-one 'unicast' packets.

Continuing with operation 52, the network packet P1 comprises: (1) Node#1's local channel time clock count ($CTC_1$) at the time of the P1's transmission ($CTC_{1,TX}$); and (2) a scheduled channel time clock count at which Node#2 is to transmit a second network packet P2 to Node#1 ($CTC_{SCHED}$). For example, within the context of a MoCA network, the CTC count is encoded in either the MAC header or payload of each MoCA network packet, where the encoded CTC count represent the time instant that the first sample of the PHY preamble is transmitted on to the MoCA network medium (i.e., coaxial cable). In one alternative embodiment, the scheduled channel time clock count at which Node#2 is to transmit may be in another packet.

After Node#2 receives the network packet P1 from Node#1 (operation 55), Node#2 at operation 58 sets its local channel time clock count ($CTC_{2,LOCAL}$) to the channel time clock count of Node#1 as reported within P1(i.e., $CTC_{1,TX}$). Subsequently, at operation 61, Node#2 sets its estimated propagation delay ($d_2$) to a predetermined estimated value, such as zero (i.e., $d_2=0$). At operation 64, Node#2 then transmits a network packet P2 to Node#1 at the scheduled channel time clock count ($CTC_{SCHED}$) indicated in network packet P1.

Once Node#1 receives network packet P2 at operation 67, Node#1 sets its estimated propagation delay ($d_1$) to half delay between the expected packet arrival time ($CTC_{SCHED}$) and the actual packet arrival time ($CTC_{ACTUAL}$). Accordingly, $$d_1 = \frac{CTC_{ACTUAL} - CTC_{SCHED}}{2}.$$

Node#1 then transmits this calculated estimated propagation delay ($d_1$) to Node#2 in a third network packet P3 at operation 73. The third network packet P3 stores the calculated delay ($d_1$) within its payload as delay value $d_{BEACON}$, which once received by Node#2 at operation 76, is set as the estimated propagation delay ($d_2$) of Node#2 at operation 79. The estimated propagation delay $d_2$ is the propagation delay stored locally by Node#2. In one alternative embodiment, the delay value is not stored locally, but rather is used without having been stored.

At the conclusion of method 50, both Node#1 and Node#2 have knowledge of the estimated propagation delay for network packets between them. Using this knowledge, Node#1 can accurately predict when network packets scheduled for a specific local channel time clock count ($CTC_{SCHED}$) will arrive from Node#2, and Node#2 can accurately synchronize its local channel time clock count ($CTC_2$) to that of Node#1 ($CTC_1$).

Depending on the embodiment and the network environment, method 50 may be performed as part of or during other processes that facilitate the communication network. For example, in a MoCA network, the method 50 can be performed such that: a new node as part of admission to the MoCA network performs synchronization and ranging to the NC (e.g., Beacon method); a new node as part of admission to the MoCA network performs synchronization and ranging to another, non-NC node that has already completed this admission process (e.g., "new node to existing node"); and periodic maintenance synchronizing and ranging is performed to track slow changes in the propagation delay (e.g., performed in conjunction with EVM maintenance).

Figure 6:
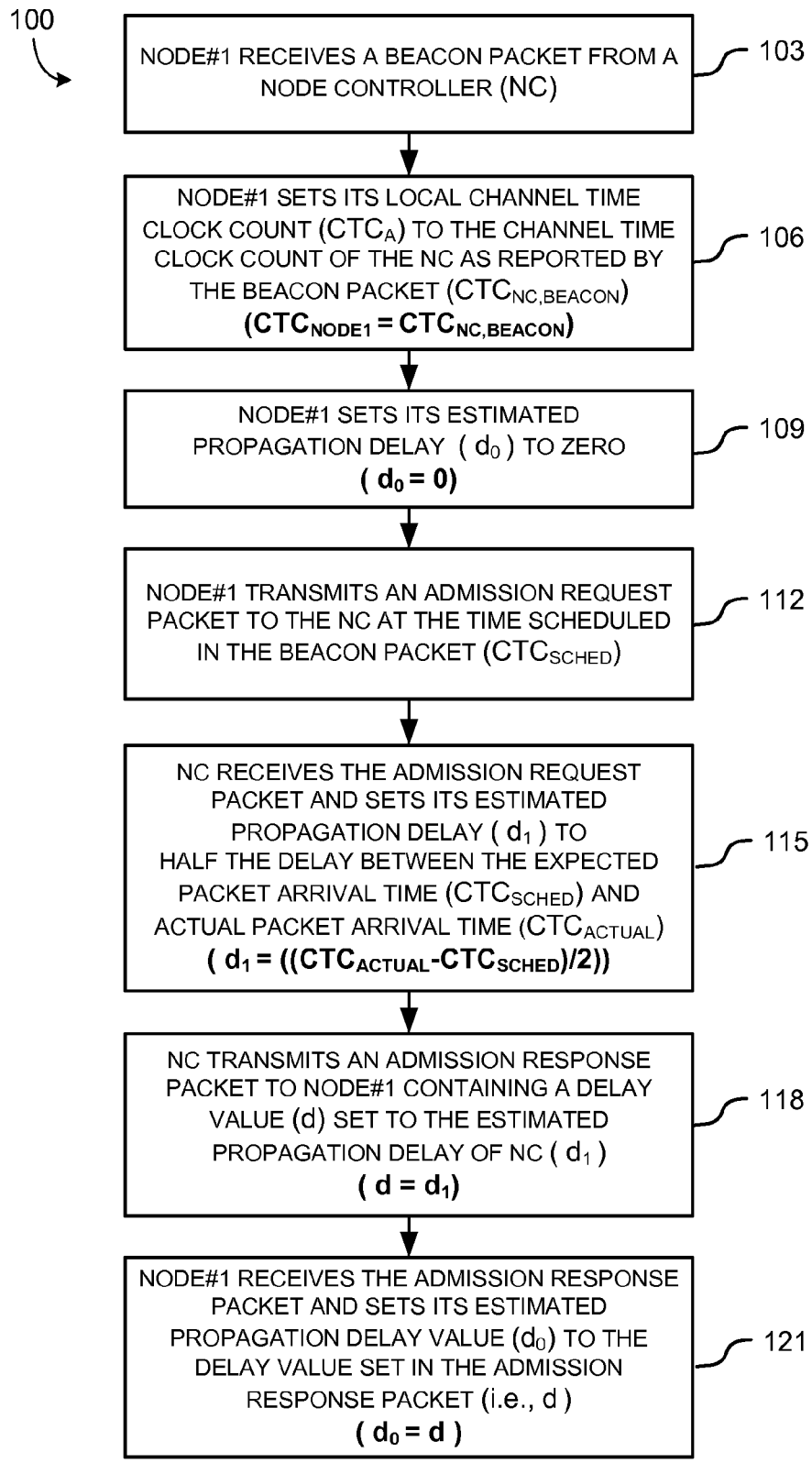
FIG. 6 is a flowchart of a method for synchronizing a plurality of nodes on a MoCA network in accordance with one embodiment of the disclosure.

FIG. 6 is a flowchart of a method 100 for synchronizing a plurality of nodes on a MoCA network in accordance with one embodiment of the disclosure. In particular, method 100 illustrates synchronizing a Node#1 to a network coordinator (NC), where Node#1 is a new node being admitting into a MoCA network. The method begins with operation 103, where new node Node#1 receives a Beacon packet from a network Coordinator (NC). In operation 106, Node A sets its local channel time clock count ($CTC_{NODE1}$) to the channel time clock count of the NC as reported by the Beacon Packet ($CTC_{NC,BEACON}$). At this point, Node#1 estimates its propagation delay ($d_0$) to be zero at operation 109.

At operation 112, Node#1 transmits an admission request packet to the NC at the time scheduled in the Beacon packet ($CTC_{SCHED}$). The NC, in turn, receives the admission request packet at operation 115, and sets its estimated propagation delay ($d_1$) to half the delay between the expected packet arrival time ($CTC_{SCHED}$) and the actual packet arrival time ($CTC_{ACTUAL}$). Accordingly, similar to method 50 of FIG. 5, $$d_1 = \frac{CTC_{ACTUAL} - CTC_{SCHED}}{2}.$$

The NC then transmits an admission response packet to Node#1 at operation 118 containing a delay value (d) set to the estimated propagation delay of the NC ($d_1$). Once Node#1 receives the admission response packet at operation 121, Node#1 sets its estimated propagation delay value ($d_0$) to the delay value set in the admission response packet (i.e., d).

Referring now to FIGS. 7 through 11, these diagrams provide for examples of clock synchronization using ranging in a MoCA network accordance with various embodiments of the disclosure. Before describing these diagrams further, it should be noted that the following naming conventions are utilized: $CTC_k$ represents the scheduled CTC time for the k-th packet; $Err_n$ represents the relative error of the n-th node's local $CTC_{NODEn}$ to the NC's $CTC_{NC}$; $D_{nm}$ is the actual propagation delay between the n-th node and the m-th node; and, $d_m$ is the propagation delay estimated by the n-th node to/from the m-th node. It should be noted that in these embodiments, the network coordinator (NC) is Node #0, and that its relative error $Err_0$ by definition is zero (i.e., $Err_0=0$).

Figure 7:
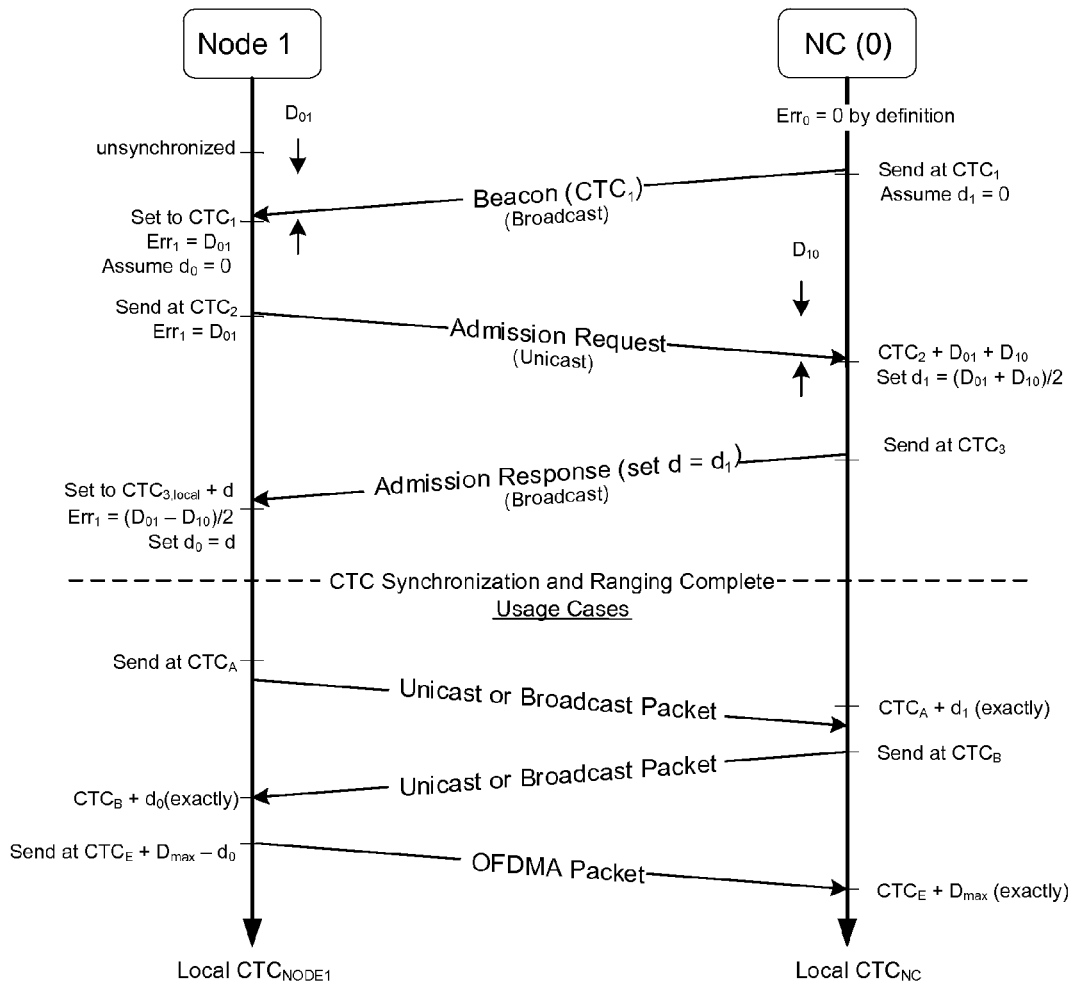
FIG. 7 is a diagram illustrating a clock synchronization example using ranging in accordance with one embodiment of the disclosure.

Turning now to FIG. 7, a diagram is provided illustrating a clock synchronization example using ranging in accordance with method 100 of FIG. 6. In this diagram, Node#1 is requesting admission to the communications network during the Beacon period. Node#1 at the beginning of this admission process has a local $CTC_{NODE1}$ that is unsynchronized with that of the NC (local $CTC_{NC}$). At this point, both the Node#1 and NC assume the propagation delay is zero (i.e., $d_1$ and $d_0$, are respectively set to zero). Once the NC broadcasts a Beacon packet to all the available nodes on the network, which contains the Beacon packet's transmission time of $CTC_1$, Node#1 receives the Beacon packet and sets its local $CTC_{NODE1}$ to $CTC_1$. The relative error between local $CTC_{NODE1}$ and local $CTC_{NC}$ is $D_{01}$. Node#1 subsequently transmits an Admission Request packet when its local $CTC_{NODE1}$ is equal to the scheduled time of $CTC_2$, which is indicated in the Beacon packet.

The Admission Request packet arrives at the NC at $CTC_2 + D_{01} + D_{10}$, where $D_{01} + D_{10}$ is the propagation delay to and propagation delay from Node#1. Assuming the propagation to and from Node#1 is reciprocal, the NC estimates the propagation delay to the new node Node#1 ($d_1$) is half the delay between the expected (i.e., $CTC_2$) and actual packet arrival time (i.e., $CTC_2 + D_{01} + D_{10}$), resulting in $$d_1 = \frac{D_{01} + D_{10}}{2}$$

The NC stores this propagation delay locally as $d_1$, subsequently sets the delay value $d=d_1$ in the Admission Response packet, and transmits the Admission Response to the new node Node#1 at the scheduled CTC time ($CTC_3$). The new node Node#1, upon receiving the Admission Response, reads the NC-specified delay (d), sets its $d_0$ to the value d, and adds the value d to its local CTC time (local $CTC_{NODE1}$).

Upon completion of the foregoing ranging and synchronization operation of FIG. 7, the CTC time of Node#1 will lag the NC's CTC time by exactly $(D_{01}-D_{10})/2$. If the channel is reciprocal, then this error will be zero. Note that regardless of channel reciprocity, the packets will always arrive at the NC or Node#1 exactly when that node expects the packet to arrive. Depicted after the CTC synchronization and ranging (i.e., after reception of the Admission Response packet by Node#1) are other packets that illustrate various usage cases.

Figure 8:
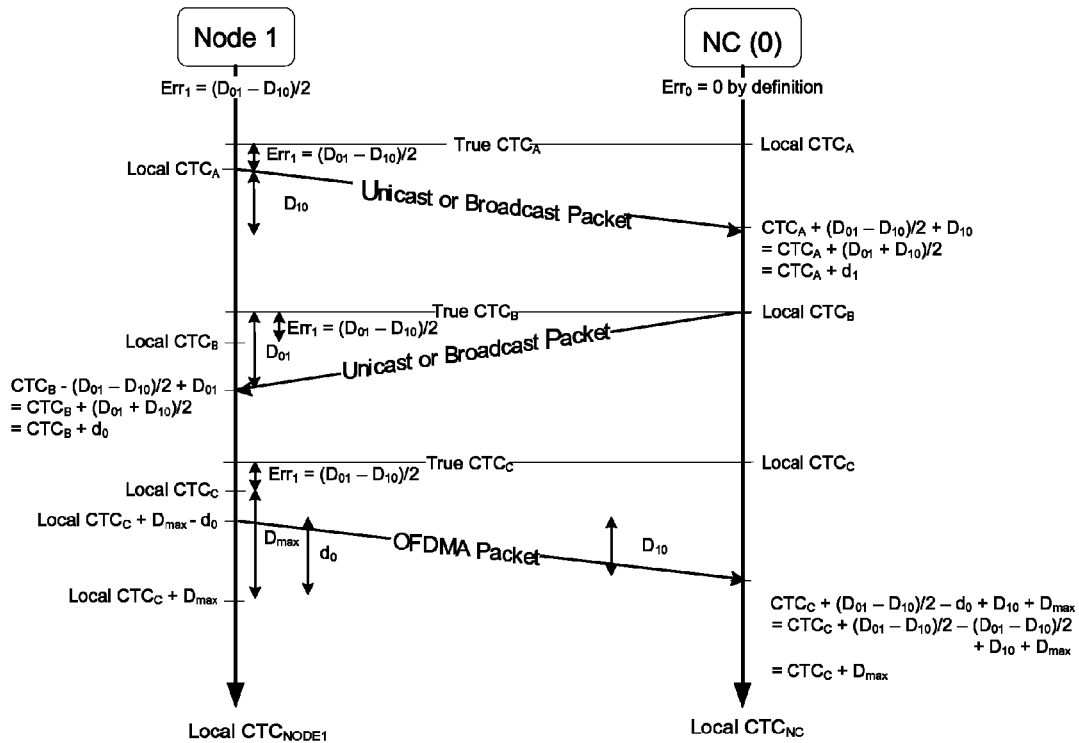
FIG. 8 is a diagram illustrating an example of communication between a node and a NC after a clock synchronization and ranging operation in accordance with one embodiment of the disclosure.

FIG. 8 is a diagram illustrating an example of communication between a node and a NC after the clock synchronization and ranging operation illustrated in FIG. 7. It should be noted that the CTC encoded in network packets transmitted to Node#1 from the NC will be off by $Err_1$ once they arrive at Node#1.

Figure 9:
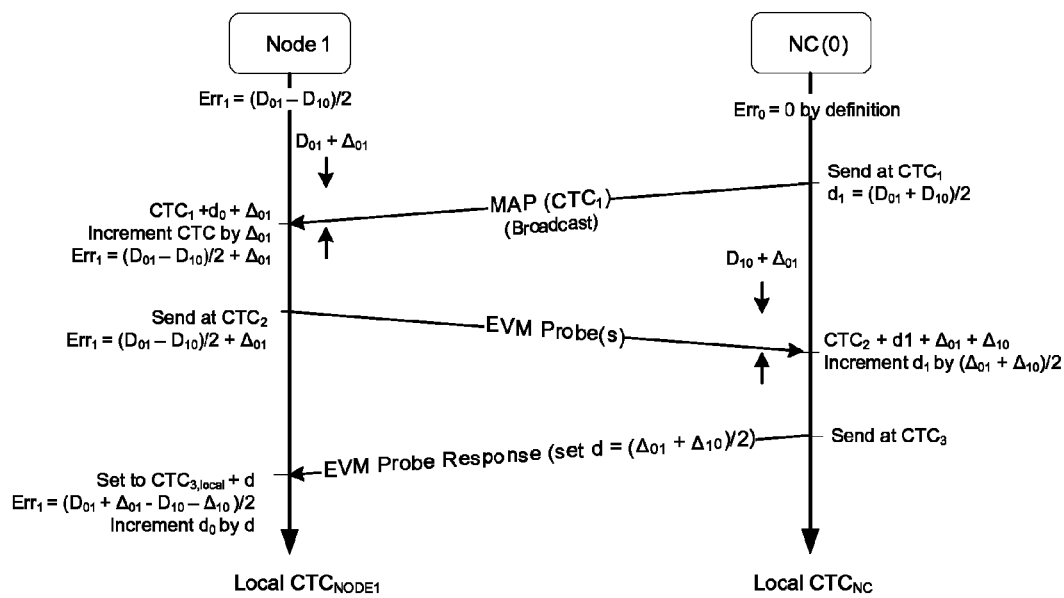
FIG. 9 is a diagram illustrating a clock synchronization example using maintenance synchronization and ranging in accordance with one embodiment of the disclosure.

FIG. 9 is a diagram illustrating a clock synchronization example using maintenance synchronization and ranging in accordance with one embodiment of the disclosure. For embodiments implemented in a MoCA network, once a node (e.g., Node#1) has been admitted to the network, the node must periodically update its ranging and synchronization information to accommodate slow channel variations. Referring now to FIG. 9, the diagram illustrates a sequence of operations that a node must follow in order to track the propagation delay between itself and the NC, as well to maintain CTC synchronization with the NC. It should be noted that, in some embodiments implemented in a MoCA network, this maintenance process is performed only once per EVM session. Although the messages are different, the maintenance synchronization and ranging illustrated in FIG. 9 is very similar to the initial acquisition method illustrated in FIG. 7. In addition, the NC may average the propagation delay estimates over time to reduce the jitter due to jitter in packet transmission time as well as due to jitter in packet arrival time estimation.

Figure 10:
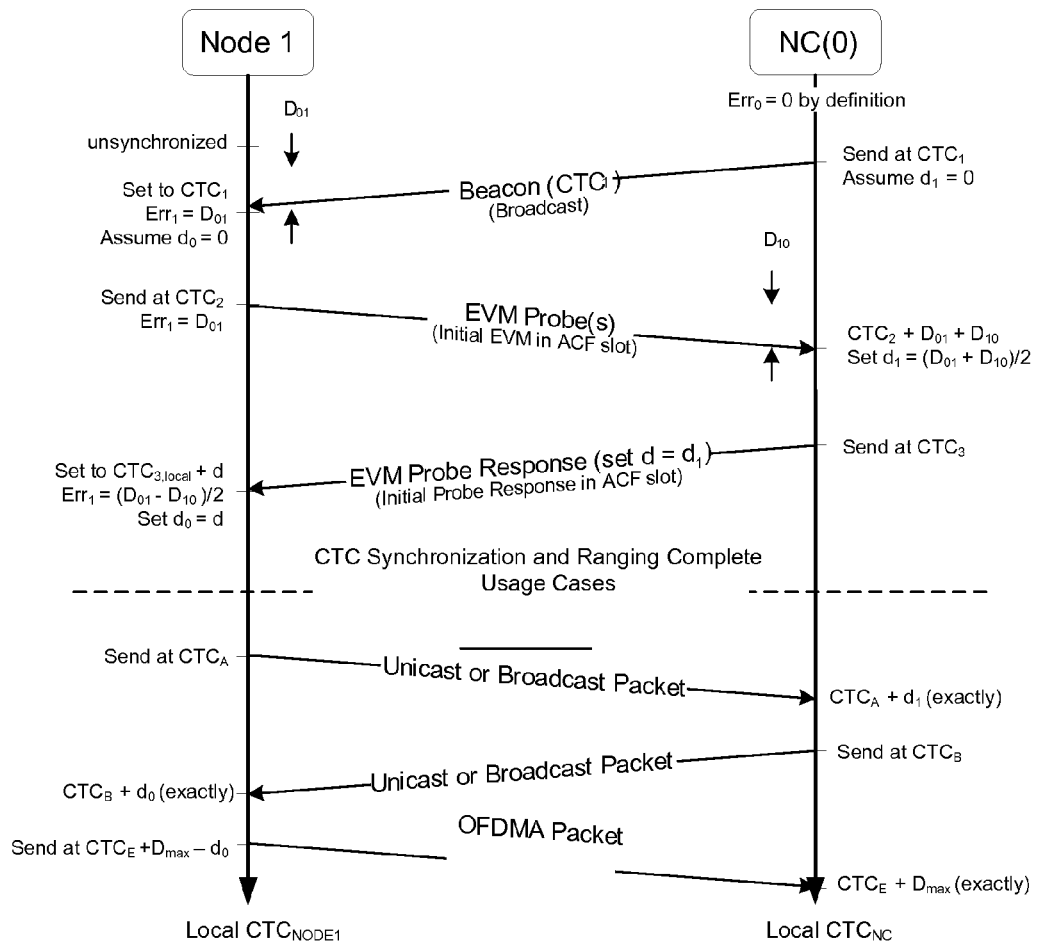
FIG. 10 is a diagram illustrating a clock synchronization example using maintenance synchronization and ranging in accordance with one embodiment of the disclosure.

Depending on the embodiment utilized in a MoCA network, the synchronization and ranging operations illustrated in FIGS. 7 through 11 may be performed as part of only the EVM function, only the Beacon period, or as part of both. When the synchronization and ranging operations in accordance with this disclosure are implemented as only part of the EVM function, there are minimal changes needed to the MAC protocol in that only the EVM Probe response of the EVM function would require a delay field to transport the estimated propagation delay. FIG. 10 is diagram similar to FIG. 9 illustrating usage cases after a CTC synchronization and ranging is complete during an EVM function.

Figure 11:
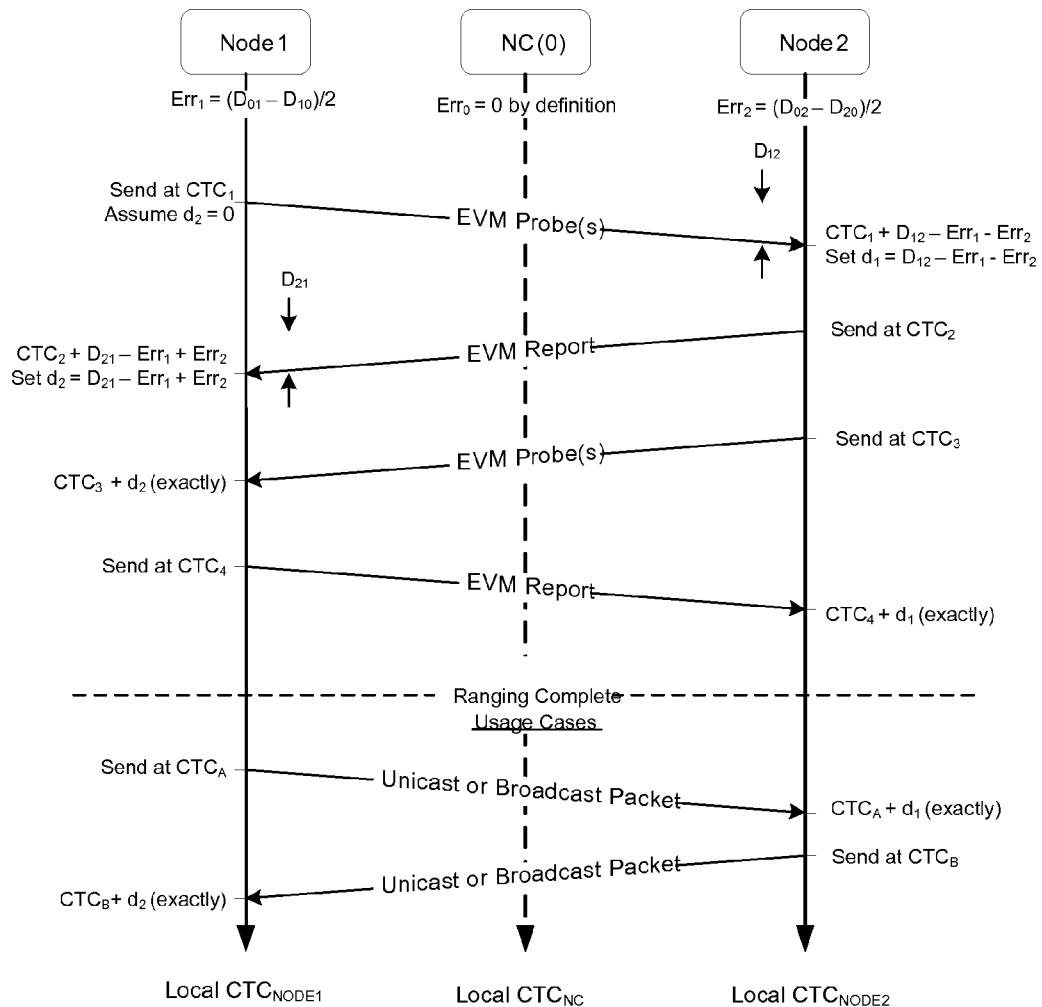
FIG. 11 is a diagram illustrating a clock synchronization example using node-to-node synchronization and ranging in accordance with one embodiment of the disclosure.

FIG. 11 is a diagram illustrating a clock synchronization example using node-to-node synchronization and ranging in accordance with one embodiment of the disclosure. Once a new node (e.g., Node#1) has completed admission to the network and has synchronized and ranged with the NC, it must perform ranging with all other nodes in the network. The purpose of this is to enable ranging to carry forward in the case of NC hand-off (i.e., the role of the NC is transferred from one network node to another), and to enable receivers to predict packet arrival time to improve automatic gain control (AGC) and burst detection functions. Ranging also enables tighter turn-on/turn-off times for the analog front end/radio-frequency (AFE/RF) circuitry which enables a shorter IFG's. Referring now to FIG. 11, the diagram illustrates a method of synchronization and ranging between two nodes, Node#1 and Node#2, already admitted in the MoCA network. In doing so, the periodic updating accounts for slow drifts in each node's local CTC count, as well as possible changes in propagation delay. Depending on the embodiment, the nodes update the ranging estimates at least once every EVM probe session or, optionally, on every EVM report. As noted above, these ranging estimates can be averaged over time to reduce the variability of packet start time and estimated packet arrival time.

Turning now to the accuracy of transmission and arrival times, according to some embodiments of the disclosure, a node synchronizes its local channel time clock (CTC) to that of another node by comparing the local receive time of a network packet to that of the CTC transmit time as indicated in the payload of that network packet. For example, in a MoCA network, a node synchronizes its CTC time to that of the NC by comparing the local receive time of a Beacon or MAP packet to the NC's CTC transmit time as reported by the Beacon or MAP packet. To ensure accuracy of the transmission and arrival times, the nodes within the network must accurately measure the transmission time and the arrival time of network packets.

Accordingly, in some embodiments, the transmission time of a transmitted network packet is measured at 90% of peak amplitude of a transmission signal, 90% of peak power of the transmission signal, 90% of total power of the transmission signal, the first arrival instant of the packet, the last arrival instant of a packet (different than the first arrival instant in the case of mediums comprising multiple different length paths between the transmitter and receiver), referenced to CP start, referenced to CP end, or a mean delay of the transmission signal carrying the transmitted network packet. In yet other embodiments, the arrival time of a received network packet is measured at 90% of peak amplitude of a received signal, 90% of peak power of the received signal, 90% of total power of the received signal, or a mean delay of the received signal carrying the received network packet. In accordance with these embodiments, FIG. 12 and FIG. 13 are graphs illustrating some of the example points for measuring packet transmission time and received time respectively.

Figure 12:
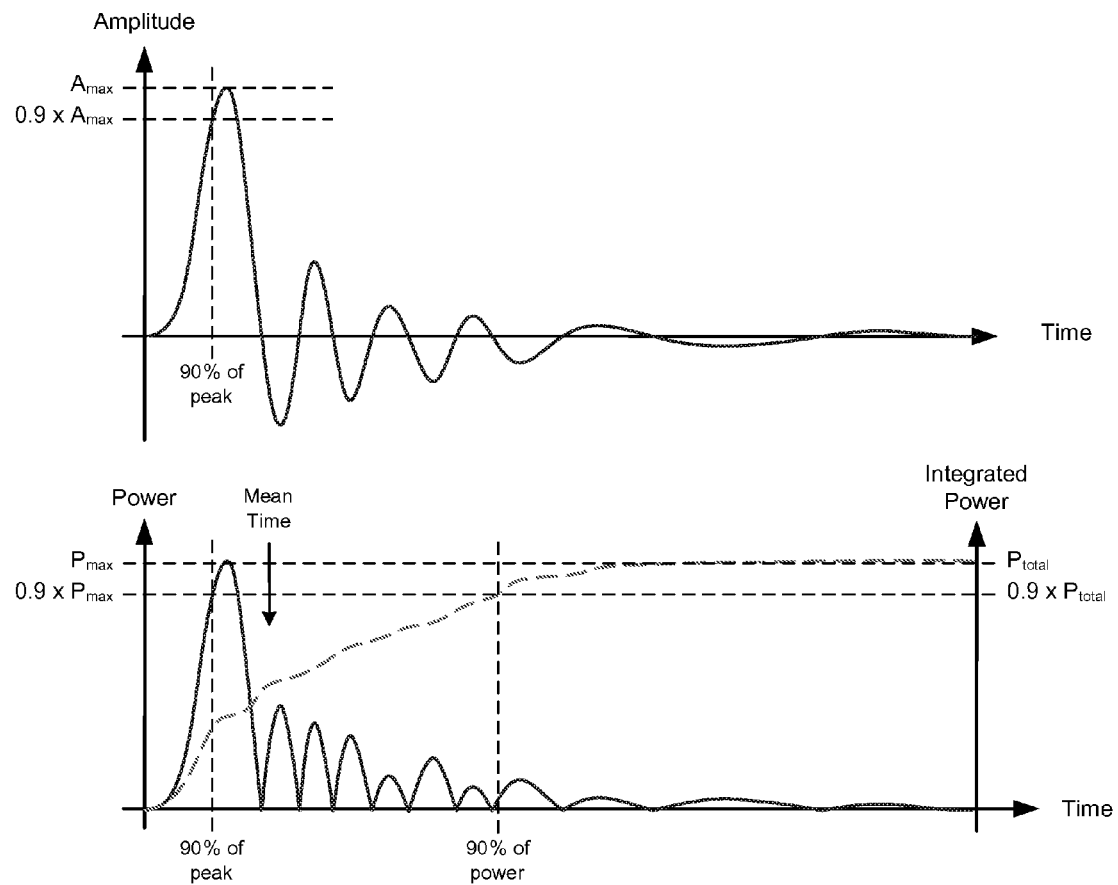
FIG. 12 are graphs illustrating example points for measuring packet transmission time in accordance with one embodiment of the disclosure.

Referring now to FIG. 12, the top graph shows an example transmitter impulse response, while the bottom graph shows the corresponding power (solid plotted curve) and integrated power (dashed curve). Time zero represents the time instant that the first sample of the preamble is inserted into an interpolator. The impulse response is measured between the interpolator input and the transmitter's interface to the transmission medium. The transmit time of this impulse will change depending on the method used to measure it. FIG. 12 shows three different possible transmit times: 90% of peak, mean time, or 90% of power. It should be noted that the 90% threshold is arbitrary and, depending on the embodiment, can be replaced with any other threshold.

Figure 13:
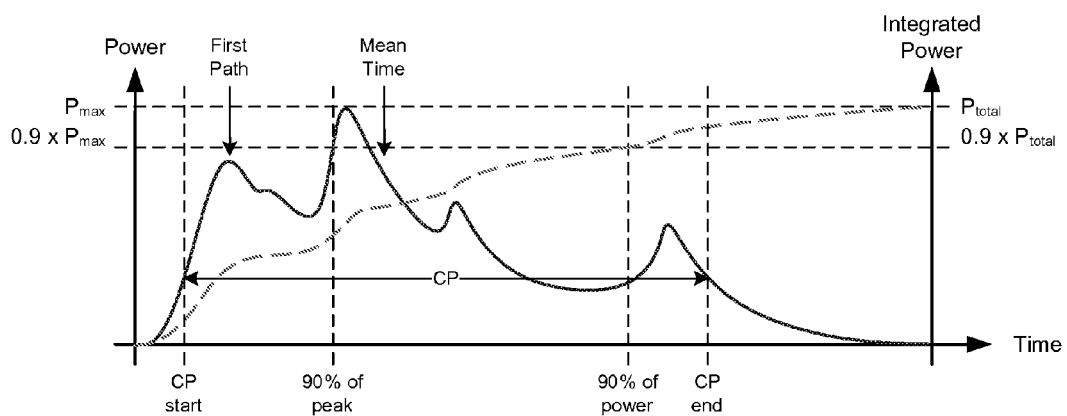
FIG. 13 is a graph illustrating example points for measuring packet arrival time in accordance with one embodiment of the disclosure.

Referring now to FIG. 13, the graph shows an example receiver power delay profile that is obtained from a echo profile probing mechanism. The graph shows the corresponding power (solid plotted curve) and integrated power (dashed curve). Time zero represents the time instant that the first sample of the preamble arrives at the RF connector. FIG. 13 shows three examples of the received time for this signal. Note that the receive times are dependent on the measurement method.

Figure 14:
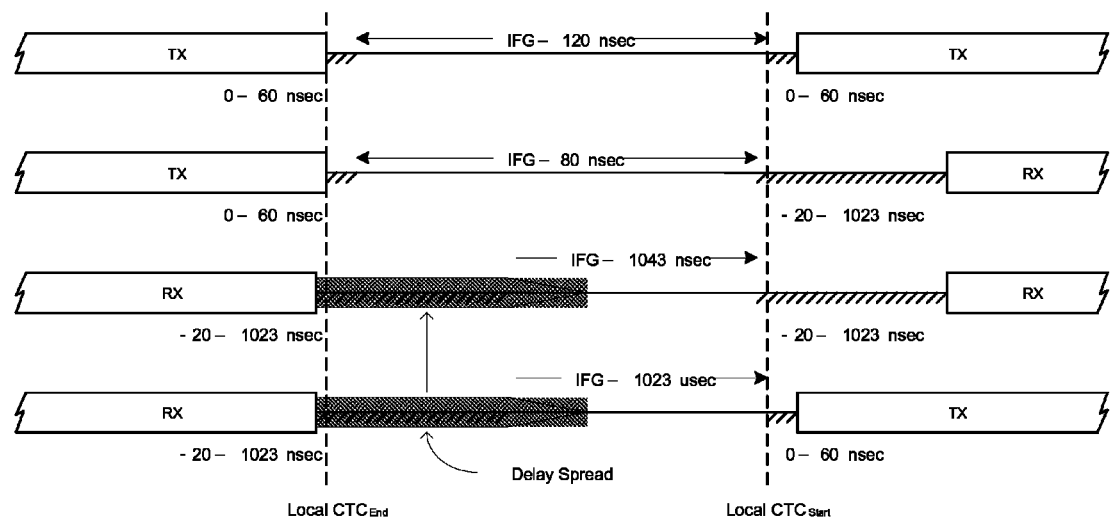
FIG. 14 is a diagram illustrating the "true" inter-frame gap for an example node in accordance with one embodiment of the disclosure.

FIG. 14 is a diagram illustrating the "true" inter-frame gap for an example node in accordance with one embodiment of the disclosure. Specifically, FIG. 14 illustrates the impact of the CTC and packet arrival time variability for c.LINK+ in a MoCA network, and the effect of delay spread for received packets. The delay spread accounts for the amount of time after the mean packet arrival time of the channel that echoes continue to arrive. In some embodiments, this delay spread can be subsequently accounted for in the IFG for the purposes of avoiding channel collisions, without impacting the amount of time the receiver has after a first packet to prepare for the next packet. In this example, the maximum delay spread is 800 nsec. In one embodiment in which the signals are modulated using OFDMA, the use of ranging to allows the accuracy and synchronization of the clocks in each node to be adjusted. In addition, knowing the amount of time it takes a packet to traverse the medium from each node to the NC allows the transmission times of nodes in the network to be delayed by an amount that will ensure that packets transmitted by various nodes in the network all arrive at the NC at the same time.

While various embodiments of the disclosed concepts have been described above, it should be understood that they have been presented by way of example only, and not of limitation. Likewise, the various diagrams may depict an example architectural or other configuration for the disclosed concepts, which is done to aid in understanding the features and functionality that can be included in the concept. Accordingly, the claimed invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Figure 15:
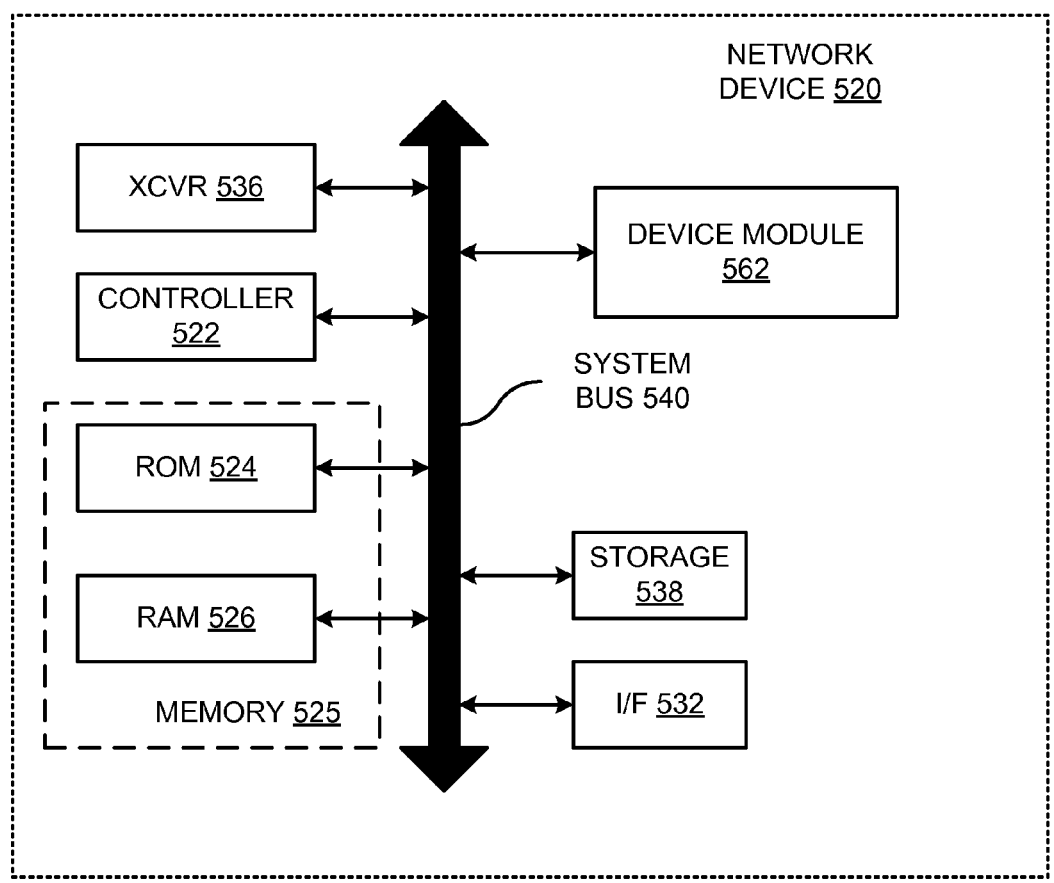
FIG. 15 is a diagram illustrating an example of a generalized architecture for a network device in accordance with one embodiment of the disclosed system, method and apparatus.

With MoCA and other network environments, the network nodes typically include a network device with a processor, controller or other processing module configured to perform device functions. The scheduling and other network management features discussed above might be performed by the device processing module, or a dedicated network module might be provided with the device to enable it to function as a network node. One example configuration of a network device that can be used with a communication network, such as the MoCA network is illustrated in FIG. 15. Referring now to FIG. 15, the example network device 520 includes a controller 522, memory 525 and a system bus 540.

Controller 522 might be implemented using a general-purpose or special-purpose processing engine such as, for example, a microprocessor, controller, or other control logic. In one embodiment, some or all of device 520 functionality can be implemented using an ASIC, PLD or other circuit device, including a processor core and memory blocks. Accordingly, controller 522 might be implemented using a processing core such as, for example, a RISC microprocessor core. Examples of RISC processor cores include ARM cores available from Advanced RISC Machines Ltd, located in Cambridge, England, and MIPS RISC cores available from MIPS Technologies, Inc., of Mountain View, Calif., although other cores are available as well. In the example illustrated in FIG. 8, controller 522 is connected to a bus 540 or other communication medium to facilitate interaction with other components of the device. Although a central bus structure is depicted, other communication media and architectures are acceptable.

Controller 522 operates to execute program code that would typically be stored, for example, in ROM 524, and generally controls the functionality for the network device. RAM 526 can also be included to serve as working memory for controller operations and other storage. Network device 520 may further include secondary storage devices 538, such as but not limited to hard drives, floppy drives, CD and DVD ROM and RWM drives, removable memory or storage devices.

For external communications, the network device can also include communications capabilities. For instance, the example illustrated in FIG. 8 includes a network transceiver 536 and an external interface 532. As a practical example, in the case of the example environment, network transceiver 536 could be a MoCA transceiver that enables the device to share data with other MoCA nodes.

The communications interfaces might also be used to allow software and data to be transferred between network device 520 and other devices or nodes. Examples of communications interface might include a modem or soft-modem, a network interface (such as an Ethernet, network interface card, WiMedia, 802.11, MoCA or other interface), a communications port (such as for example, a USB port, IR port, RS232 port Bluetooth interface, or other port), or other communications interface. Software and data transferred via communications interfaces might typically be carried on signals, which can be electronic, electromagnetic, optical or other signals capable of being exchanged by a given communications interface. These signals might be provided to communications the interface via a compatible channel, which might carry signals and might be implemented using a wired or wireless medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory or storage units, storage media, and signals on channel. These and other various forms of computer media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions can enable the device to perform features or functions as discussed herein.

Device module 562 is a black-box representation of the functionality that can be performed by the network device 520 and that may vary depending on that the nature of the actual device. For example, assume that network device 520 in this example is a digital video camera. In this implementation, device module 562 might include imaging optics, an image sensor, image buffers, and other like functionality. Device module 562 can further include processing and memory capabilities, or can use controller 522, and memory 525 for some or all of its operational abilities. As this example illustrates, network device 520 might be implemented as other devices having other components, configurations or functionality.

As used herein, the term module might describe a given unit of functionality that can be performed. As used herein, a module might be implemented utilizing any form of hardware, software, or a combination thereof. For example, one or more processors, controllers, ASICs, PLAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Although the concepts are described above in terms of various embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments consistent with the disclosed concepts, whether or not such embodiments are described and whether or not such features are presented as being a part of a described embodiment. Thus, the breadth and scope of the claimed invention should not be limited by any of the above-described embodiments, but rather will find support from the disclosure to the full extent of the concepts exemplified by the disclosed embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide selected instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components disclosed may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described as examples of block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for synchronizing a plurality of nodes on a communication network, comprising:

exchanging a local clock time between a first node and a second node over the communication network, wherein the exchange comprises:

transmitting a first packet from the first node to the second node, wherein the first packet includes a first packet clock time set to the local clock time of the first node at transmission time, and includes a scheduled arrival clock time, and setting the local clock time of the second node to the first packet clock time;

performing a ranging method between the first and second nodes based on the local clock time exchanged, wherein the ranging method results in an estimated propagation delay between the first and second node, and wherein the ranging method comprises:

transmitting a second packet from the second node to the first node, wherein the second packet is transmitted from the second node at the scheduled arrival clock time, and wherein the second packet is received by the first node at an actual arrival clock time, calculating and storing the estimated propagation delay at the first node, wherein calculating the estimated propagation delay is based on the scheduled arrival clock time and the actual arrival time, and transmitting a third packet from the first node to the second node, wherein the third packet comprises the estimated propagation delay; and adjusting the local clock time of either the first or second node based on the estimated propagation delay, thereby resulting in a synchronized local clock time between the first and second node.

2. The method of claim 1, further comprising using the synchronized local clock time in subsequent packet transmissions between the first and second nodes.

3. The method of claim 1, wherein adjusting the local clock times comprises storing the estimated propagation delay at the second node.

4. The method of claim 1, wherein a transmission time of a transmitted packet is measured at 90% of peak amplitude of a transmission signal, 90% of peak power of a transmission signal, 90% of total power of a transmission signal, or a mean delay of a transmission signal.

5. The method of claim 1, wherein an arrival time of a received packet is measured at 90% of peak amplitude of a received signal, 90% of peak power of a received signal, 90% of total power of a received signal, or a mean delay of a received signal.

6. The method of claim 1, wherein the first node is a network coordinator.

7. The method of claim 1, wherein the second node is a new node and the method is performed as part of admission of the second node to the communication network.

8. The method of claim 1, wherein the method is performed periodically to maintain synchronization between the first and second nodes.

9. The method of claim 1, wherein the communication network is a mesh network.

10. The method of claim 1, wherein the communication network operates in accordance with a Multimedia over Coax Alliance (MoCA) standard.

11. A network device, comprising:
a controller;
a device module;
memory coupled to the controller;
computer executable program code on a non-transitory computer readable medium configured to cause the controller to perform the functions of:
exchanging local clock times between a first node and a second node over a communication network, wherein the exchange comprises:
transmitting a first packet from the first node to the second node, wherein the first packet includes a first packet clock time set to the local clock time of the first node at transmission time, and includes a scheduled arrival clock time, and
setting the local clock time of the second node to the first packet clock time;
performing a ranging method between the first and second nodes based on the local clock times exchanged between the first and second nodes, wherein the ranging method results in an estimated propagation delay between the first and second nodes, and wherein the ranging method comprises:
transmitting a second packet from the second node to the first node, wherein the second packet is transmitted from the second node at the scheduled arrival clock time, and wherein the second packet is received by the first node at an actual arrival clock time,
calculating and storing the estimated propagation delay at the first node, wherein calculating the estimated propagation delay is based on the scheduled arrival clock time and the actual arrival time, and
transmitting a third packet from the first node to the second node, wherein the third packet comprises the estimated propagation delay; and
adjusting the local clock times of either the first and second nodes based on the estimated propagation delay, thereby resulting in a synchronized local clock time at the first and second nodes.

12. The network device of claim 11, wherein the computer executable program code is further configured to cause the controller to use the synchronized local clock time in subsequent packet transmissions between the first and second nodes.

13. The network device of claim 11, wherein adjusting the local clock times comprises storing the estimated propagation delay at the second node.

14. The network device of claim 11, wherein a transmission time of a transmitted packet is measured at 90% of peak amplitude of a transmission signal, 90% of peak power of a transmission signal, 90% of total power of a transmission signal, or a mean delay of a transmission signal.

15. The network device of claim 11, wherein an arrival time of a received packet is measured at 90% of peak amplitude of a received signal, 90% of peak power of a received signal, 90% of total power of a received signal, or a mean delay of a received signal.

16. The network device of claim 11, wherein the first node is a network coordinator.

17. The network device of claim 11, wherein the second node is a new node and the functions are performed as part of admission of the second node to the communication network.

18. The network device of claim 11, wherein the functions of exchanging local clock times, performing the ranging method, and adjusting the local clock times are performed periodically to maintain synchronization between the first and second nodes.

19. The network device of claim 11, wherein the communication network is a mesh network.

20. The network device of claim 11, wherein the communication network operates in accordance with a Multimedia over Coax Alliance (MoCA) standard.

21. A computer program product comprising a non-transitory computer usable medium having computer readable program code embodied therein for synchronizing a plurality of nodes on a communication network, the compute program product comprising computer readable program code configured to cause a device to:
exchange local clock times between a first node and a second node over a communication network, wherein the exchange comprises:
transmitting a first packet from the first node to the second node, wherein the first packet includes a first packet clock time set to the local clock time of the first node at transmission time, and includes a scheduled arrival clock time, and
setting the local clock time of the second node to the first packet clock time;
perform a ranging method between the first and second nodes based on the local clock times exchanged between the first and second nodes, wherein the ranging method results in an estimated propagation delay between the first and second nodes, and wherein the ranging method comprises:
transmitting a second packet from the second node to the first node, wherein the second packet is transmitted from the second node at the scheduled arrival clock time, and wherein the second packet is received by the first node at an actual arrival clock time,
calculating and storing the estimated propagation delay at the first node, wherein calculating the estimated propagation delay is based on the scheduled arrival clock time and the actual arrival time, and
transmitting a third packet from the first node to the second node, wherein the third packet comprises the estimated propagation delay; and
adjust the local clock times of either the first and second nodes based on the estimated propagation delay, thereby resulting in a synchronized local clock time at the first and second nodes.

22. The computer program product of claim 21, wherein the computer executable program code is further configured to cause the device to use the synchronized local clock time in subsequent packet transmissions between the first and second nodes.

23. The computer program product of claim 21, wherein adjusting the local clock times comprises storing the estimated propagation delay at the second node.

24. The computer program product of claim 21, wherein a transmission time of a transmitted packet is measured at 90% of peak amplitude of a transmission signal, 90% of peak power of a transmission signal, 90% of total power of a transmission signal, or a mean delay of a transmission signal.

25. The computer program product of claim 21, wherein an arrival time of a received packet is measured at 90% of peak amplitude of a received signal, 90% of peak power of a received signal, 90% of total power of a received signal, or a mean delay of a received signal.

26. The computer program product of claim 21, wherein the first node is a network coordinator.

27. The computer program product of claim 21, wherein the second node is a new node and the functions are performed as part of admission of the second node to the communication network.

28. The computer program product of claim 21, wherein the functions of exchanging local clock times, performing the ranging method, and adjusting the local clock times are performed periodically to maintain synchronization between the first and second nodes.

29. The computer program product of claim 21, wherein the communication network is a mesh network.

30. The computer program product of claim 21, wherein the communication network operates in accordance with a Multimedia over Coax Alliance (MoCA) standard.

31. A network interface module, comprising:
a controller;
memory coupled to the controller;
computer executable program code on a non-transitory computer readable medium configured to cause the controller to perform the functions of:
exchanging local clock times between a first node and a second node over a network, wherein the exchange comprises:
transmitting a first packet from the first node to the second node, wherein the first packet includes a first packet clock time set to the local clock time of the first node at transmission time, and includes a scheduled arrival clock time, and
setting the local clock time of the second node to the first packet clock time;
performing a ranging method between the first and second nodes based on the local clock times exchanged between the first and second nodes, wherein the ranging method results in an estimated propagation delay between the first and second nodes, and wherein the ranging method comprises:
transmitting a second packet from the second node to the first node, wherein the second packet is transmitted from the second node at the scheduled arrival clock time, and wherein the second packet is received by the first node at an actual arrival clock time,
calculating and storing the estimated propagation delay at the first node, wherein calculating the estimated propagation delay is based on the scheduled arrival clock time and the actual arrival time, and
transmitting a third packet from the first node to the second node, wherein the third packet comprises the estimated propagation delay; and
adjusting the local clock times of either the first and second nodes based on the estimated propagation delay, thereby resulting in a synchronized local clock time at the first and second nodes.

32. The network interface module of claim 31, wherein the computer executable program code is further configured to cause the controller to use the synchronized local clock time in subsequent packet transmissions between the first and second nodes.

33. The network interface module of claim 31, wherein adjusting the local clock times comprises storing the estimated propagation delay the second node.

34. The network interface module of claim 31, wherein a transmission time of a transmitted packet is measured at 90% of peak amplitude of a transmission signal, 90% of peak power of a transmission signal, 90% of total power of a transmission signal, or a mean delay of a transmission signal.

35. The network interface module of claim 31, wherein an arrival time of a received packet is measured at 90% of peak amplitude of a received signal, 90% of peak power of a received signal, 90% of total power of a received signal, or a mean delay of a received signal.

36. The network interface module of claim 31, wherein the first node is a network coordinator.

37. The network interface module of claim 31, wherein the second node is a new node and the functions are performed as part of admission of the second node to the communication network.

38. The network interface module of claim 31, wherein the functions of exchanging local clock times, performing the ranging method, and adjusting the local clock times are performed periodically to maintain synchronization between the first and second nodes.

39. The network interface module of claim 31, wherein the communication network is a mesh network.

40. The network interface module of claim 31, wherein the communication network operates in accordance with a Multimedia over Coax Alliance (MoCA) standard.

* * * * *